United States Patent [19]

Kerian

[11] Patent Number: 4,601,508
[45] Date of Patent: Jul. 22, 1986

[54] STREAMLINING APPENDAGE FOR VEHICLES

[76] Inventor: Paul D. Kerian, 317 Northwestern Dr., Grand Forks, N. Dak. 58201

[21] Appl. No.: 621,801

[22] Filed: Jun. 18, 1984

[51] Int. Cl.⁴ .................... B62D 35/00; B60V 1/00
[52] U.S. Cl. .................................. 296/1 S; 180/119
[58] Field of Search .................... 296/1 S, 91, 217; 180/116, 117, 119, 124

[56] References Cited

U.S. PATENT DOCUMENTS

| | | | |
|---|---|---|---|
| 1,923,349 | 8/1933 | Wolverton | 296/1 S |
| 2,037,942 | 4/1936 | Stalker | 296/1 S |
| 2,199,883 | 5/1940 | Ishiwata | 180/68 R |
| 2,242,494 | 5/1941 | Wolf | 180/54 |
| 2,514,695 | 7/1950 | Dempsey | 296/1 S |
| 3,381,627 | 5/1968 | Hart et al. | 180/119 X |
| 3,434,560 | 3/1969 | Rockwell, Jr. | 180/119 |
| 3,486,577 | 12/1969 | Jackes | 180/126 X |
| 3,854,769 | 12/1974 | Saunders | 296/1 |
| 3,910,623 | 10/1975 | McKeen | 296/1 |
| 3,929,202 | 12/1975 | Hobbensiefken | 180/68 R |
| 4,142,755 | 3/1979 | Keedy | 296/91 X |
| 4,175,636 | 11/1979 | Broughton | 180/124 X |

FOREIGN PATENT DOCUMENTS

| | | | |
|---|---|---|---|
| 3115742 | 4/1982 | Fed. Rep. of Germany | 296/1 S |
| 945869 | 5/1949 | France | 296/1 S |
| 2509681 | 1/1983 | France | 296/1 S |

Primary Examiner—Robert B. Reeves
Assistant Examiner—Russell D. Stormer
Attorney, Agent, or Firm—Zarley, McKee, Thomte, Voorhees & Sease

[57] ABSTRACT

A streamlining appendage for the rearward end of a vehicle having a generally flat upright rearward surface includes a rearwardly tapering peripheral body defining and surrounding a rearwardly open plenum chamber. An opening is provided through the peripheral body for delivery of air into the plenum chamber for ejection through the open rearward end thereof to dissipate the partial vacuum which forms behind a forwardly moving vehicle. Air may be ducted to the appendage opening from higher pressure zones toward the forward end of the vehicle or from a forced air blower on the vehicle.

23 Claims, 12 Drawing Figures

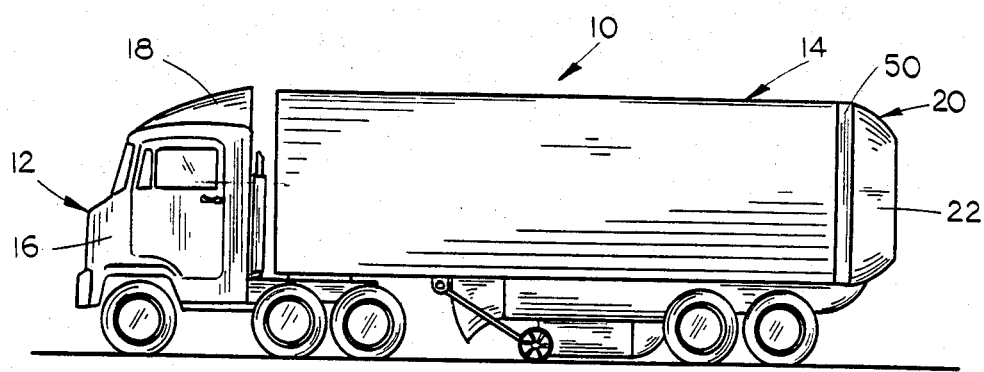
FIG. 1
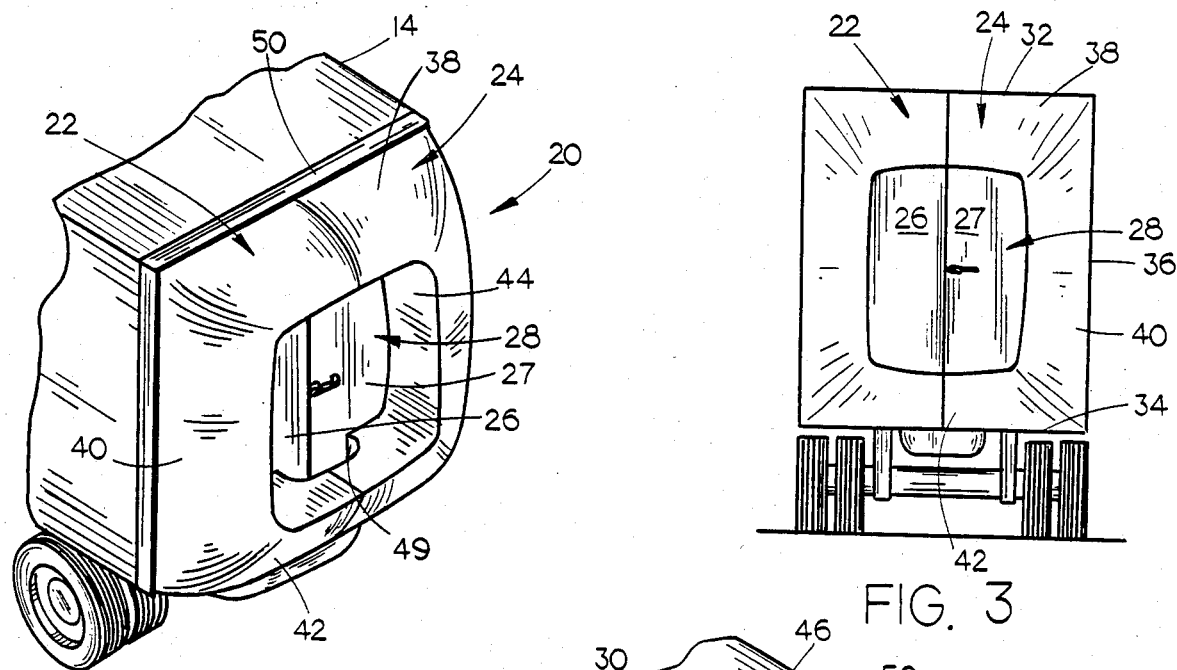
FIG. 2
FIG. 3
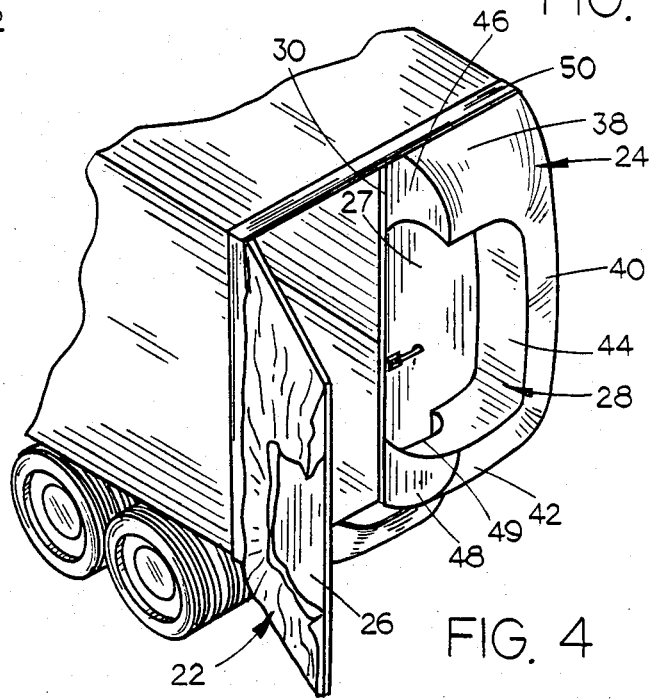
FIG. 4

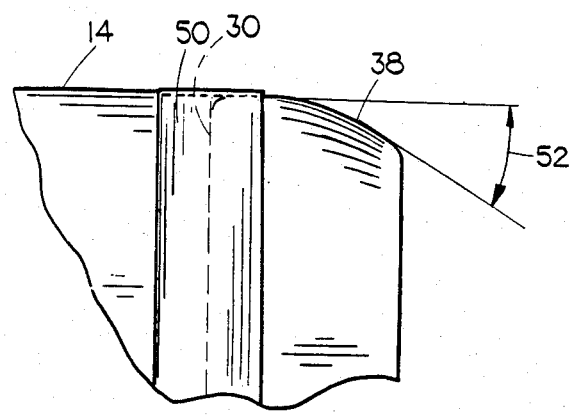
FIG. 5
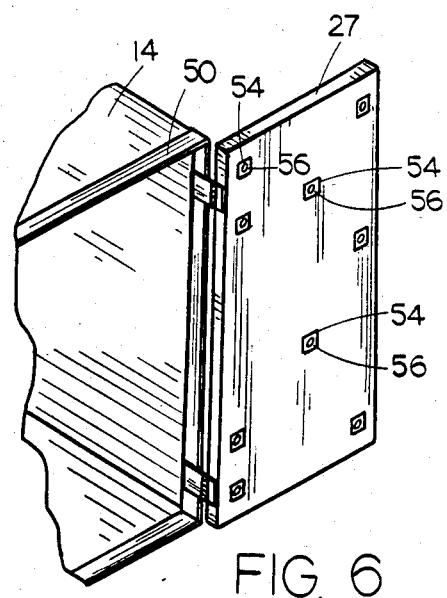
FIG. 6
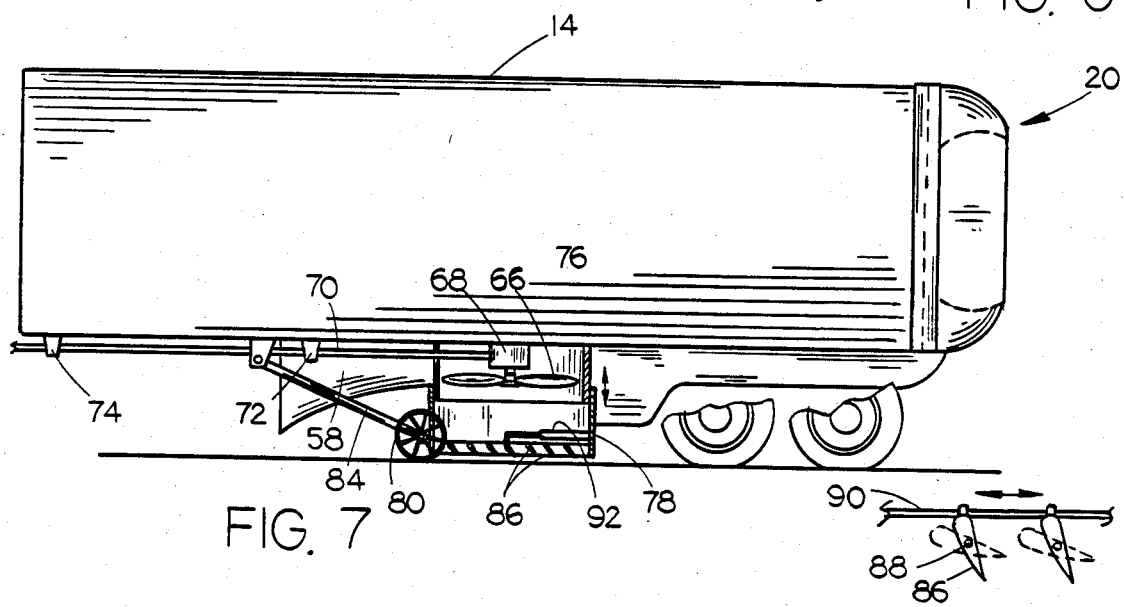
FIG. 7
FIG. 7A
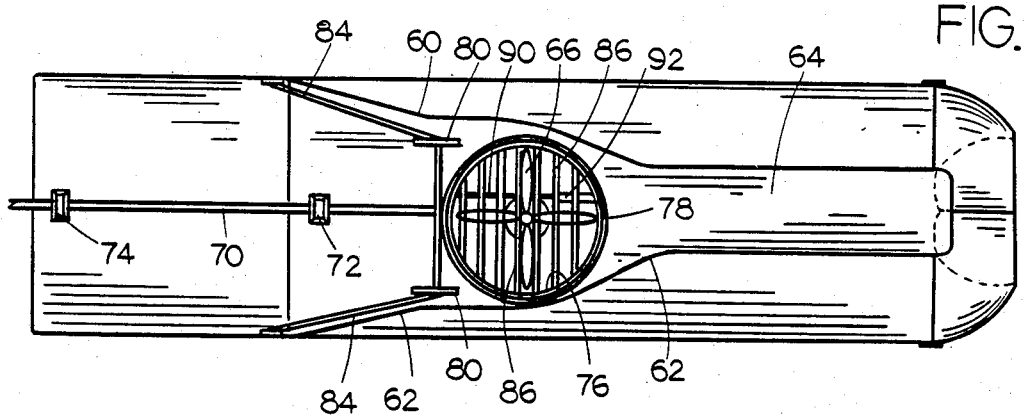
FIG. 8

STREAMLINING APPENDAGE FOR VEHICLES

BACKGROUND OF THE INVENTION

The present invention is directed generally to a streamlining appendage for the rearward end of a vehicle and more particularly to a foreshortened peripheral open ended appendage into which air from around the vehicle is directed for expelling that air at the rearward end of the vehicle to minimize turbulence and dispel the relative vacuum formed by the vehicle's forward movement.

Many vehicles such as tractor trailer trucks are designed to maximize their load carrying capacity with little consideration given to aerodynamic performance. Various wind foils and the like have been provided for increasing the aerodynamic efficiency of the tractors and the upper forward ends of the trailers to facilitate slicing through a mass of air. Little, if anything, has been done to streamline the rearward end of such large vehicles as truck trailer combinations, trains and the like.

Furthermore, little attention has been given to the manner in which the weight of a vehicle is distributed so as to minimize its deleterious affect upon the structural integrity of the surface overwhich the vehicle travels.

Generally, aerodynamic efficiency of an imperfectly streamlined vehicle can be improved where streamlining is not practicable by: (1) passively ducting, displaying or venting air so as to minimize drag, or (2) by actively moving air by fan or blower and thereby achieving "forced aerodynamics".

Prior ground effect machines commonly referred to as Hovercraft, utilized forced air, but for other than aerodynamic purposes. Such vehicles have generally been designed for lift, with little or no consideration given to the possibilities for aerodynamic applications for the airstreams created thereby.

Accordingly, a primary object of the invention is to provide an improved streamlining appendage for the rearward end of a vehicle.

Another object is to provide a streamlining appendage which is operative to dissipate the vacuum created at the rearward end of a vehicle in response to forward movement.

Another object is to provide a rearward appendage for a vehicle which minimizes turbulent air flow behind the vehicle.

Another object is to provide a streamlining appendage through which air is ejected to equalize the pressure differential between the front and rear ends of the vehicle.

A further object is to provide a streamlining appendage for the rearward end of a vehicle which is formed in two half sections for attachment to conventional cargo doors.

Another object is to provide a rearward streamlining appendage which is collapsible to avoid interference with loading docks, swinging movement of the doors, etc.

Another object is to provide a streamlining appendage which cooperates with depending skirts below a vehicle for receiving air from the underside of a vehicle and ejecting it at the rearward end.

Another object is to provide a rearward streamlining appendage which receives forced air from a blower carried on the underside of the vehicle.

Another object is to provide a vehicle with a fan on the underside thereof to better distribute vehicular weight to the road surface while minimizing tire wear and friction.

Another object is to provide on the underside of a vehicle, an enclosed fan (ground effect machine or hovercraft) which is safe and efficient for commercial use due to multiple skirts which scavenge air blown outwardly therefrom so as to prevent damage to others and their property while utilizing scavenged air for aerodynamic purposes.

Another object is to provide an inner skirt surrounding the fan which can be raised to increase weight on the vehicle wheels for increased traction when braking.

Another object is to provide a vehicle with a ground effect machine or hovercraft accessory which would be installed in a manner to contribute towards the forward momentum of the vehicle.

Another object is to provide a streamlining appendage which is simple and rugged in construction, economical to manufacture and efficient in operation.

SUMMARY OF THE INVENTION

The streamlining appendage of the present invention is adapted for mounting on the rearward end of a vehicle having a generally flat upright rearward surface. The appendage includes an upright peripheral body defining and surrounding a rearwardly open plenum chamber. The peripheral body has a generally flat upright front wall, a top wall which extends rearwardly and downwardly from the top edge of the front wall and a pair of opposite side walls which extend rearwardly and transversely inwardly from the opposite side edges of the front wall. A bottom wall may also be provided which extends rearwardly and upwardly from the lower edge of the front wall. An opening is provided through the peripheral body, preferably through the bottom wall thereof, for communication of forced air into the plenum chamber for ejection through the open rearward end thereof.

The appendage's outer surface has a foreshortened torpedo shape and the entire appendage may be collapsed against the vehicle when not in use.

A depending skirt on the underside of the vehicle directs air into a duct for conveyance through the peripheral body into the plenum chamber at the rearward end of the vehicle. A blower may be provided on the underside of the vehicle which directs air downwardly for lowering the axle weight of the vehicle and minimizing tire wear during travel. A peripheral skirt surrounding the blower is elevated in response to application of the vehicle brakes for increasing traction at the rearward wheels.

The present invention therefore uses controlled air flow to improve both the aerodynamic efficiency of a vehicle as well as the manner in which vehicular weight is distributed to the roadbed. The enclosed fan of the present invention improves upon conventional ground effect machines or hovercraft by adopting them to generate both aerodynamic and lifting forces to thereby safely and efficiently minimize road surface damage, tire wear and conserve energy by reducing friction and increasing vehicular aerodynamic efficiency.

The improvements of the present invention which utilize a ground effect machine or hovercraft, include multiple skirts which capture or scavenge the air escaping from under the skirt which surrounds the fan after it has provided the desired lift. This scavenged air is diverted rearwardly into the plenum of the aerodynamic appendage on the rear of the vehicle.

The other improvements making the hoovercraft or ground effect machine feature appropriate for use in interstate commerce include the wheels for keeping the skirts in position relative to the road, and the capability for raising the inner skirt which surrounds the lift producing fan, thereby restoring increased vehicle weight to the wheels for braking. Finally, to aid the forward momentum of the vehicle, scavenged air is diverted rearwardly for aerodynamic purposes. For safety reasons and to prevent dust and debris propagation, the interior of the skirt between the fan and that portion of the skirt which can be raised has lathes or louvers, the pitch of which can be adjusted to displace or angle the escaping air rearwardly.

BRIEF DESCRIPTION OF THE DRAWINGS

FIG. 1 is a side elevational view of a truck equipped with the streamlining appendage of the invention;

FIG. 2 is an enlarged perspective view of the rearward end of a truck equipped with the streamlining appendage;

FIG. 3 is a rear elevational view of a truck equipped with the streamlining appendage;

FIG. 4 is a partial perspective view of the rearward end of a vehicle showing the left half of the appendage collapsed on an open door;

FIG. 5 is a detail side view showing the interface slashing between the vehicle and appendage;

FIG. 6 is a detail perspective view showing the hinge action of a door equipped with the appendage;

FIG. 7 is a partially sectional side elevational view of the vehicle trailer with the outer skirt removed to expose the inner skirt which can be raised and lowered on demand;

FIG. 7A is an enlarged detail side elevational view of a pair of louvers on the outer height adjustable skirt shown in FIG. 7;

FIG. 8 is a bottom plan view of a truck trailer equipped with the appendage and ground effect or hovercraft blower of the present invention;

DESCRIPTION OF THE PREFERRED EMBODIMENTS

Figure 9:
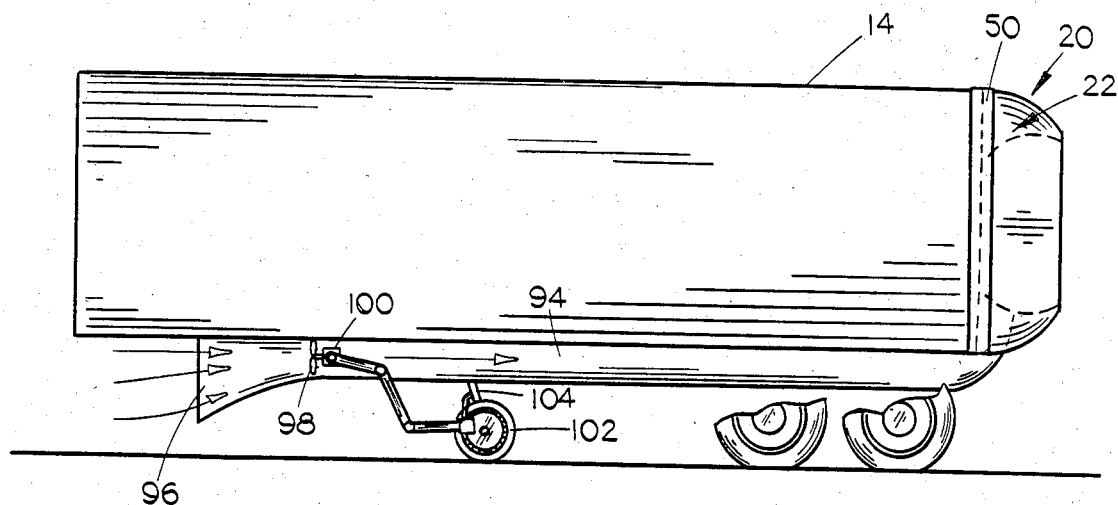
FIG. 9 is a partially sectional side elevational view of a trailer having a nonloadbearing horizontal axis blower and drive wheel.

FIG. 1 illustrates a highway truck 10 including a tractor 12 and trailer 14. The tractor includes a cab 16 with a wind deflector 18 at the top of the cab for streamlining the forward end of the vehicle.

In accordance with the present invention, a streamlining appendage 20 is mounted at the rearward end of trailer 14 both for streamlining the rearward end of the vehicle and for dissipating the relative vacuum which tends to form behind a forwardly moving vehicle. The appendage 20 is provided in two half sections 22 and 24 which are mounted on the pair of large hinged cargo doors 26 and 27 which span and close the rearward end of the trailer. Each half section of the appendage comprises a generally C-shaped peripheral body defining and surrounding one-half of a rearwardly open plenum chamber 28 which is formed within and between the half sections 22 and 24 as shown in FIG. 2. Since the half sections 22 and 24 are identical but for being the mirror image of one another, like reference numerals will be used to describe like parts of each. Thus each half section has a generally flat upright front wall 30 having a top edge 32, bottom edge 34 and side edge 36 (FIG. 3).

A top wall 38 extends rearwardly and downwardly from the top edge 32; a side wall 40 extends rearwardly and transversely inwardly from side edge 36 and a bottom wall 42 extends rearwardly and upwardly from bottom edge 34. As shown in FIG. 4, the top, side and bottom walls 38, 40 and 42 form the outer skin of an inflatable membrane having a generally concave inner wall 44 and end closure walls 46 and 48. The lower end of each half section includes a vertical opening therethrough for communication with duct work on the underside of the trailer which supplies air to the plenum chamber 28 as described hereinbelow. When fully inflated, it is seen that the walls of each half section are relatively thick at their forward ends against the cargo door and taper rearwardly therefrom with decreasing thickness. Furthermore, both the inner wall 44 and outer walls 38, 40 and 42 have arcuate surfaces for a functional aerodynamic shape.

Means are provided for automatically inflating and deflating the half sections. The pressurized air tank of every highway trailer may be used as the source of pressurized air and suitable air lines and control valves are installed as needed.

Upon deflation, the raisin-like effect of the material of the appendage causes each half section to collapse inwardly against the cargo door as illustrated in FIG. 4. Alternately, a series of internal bungee cords could be installed for urging the outermost edge of the appendage inwardly toward the doors or a collapsible mechanical framework would be provided within the appendage. For simplicity of structure and operation, the frameless appendage is preferred.

Referring to FIG. 5, a flashing strip 50 covers the junction between the appendage half sections and trailer. The flashing 50 is a thin strip of sheet material secured to the peripheral edge of the trailer and extended rearwardly therefrom. At the rearward edge of the flashing 50, the appendage is generally tangential so as to minimize any turbulence which may otherwise be created at that junction. This elimination of turbulence increases aerodynamic efficiency and protects the forward portion of the appendage. Even rearwardly of the flashing 50, it is preferred that the maximum angle that the arcuate appendage forms with the trailer wall does not exceed 30° as indicated by arrow 52 in FIG. 5.

Each appendage half section 22 and 24 may be connected to its respective cargo door 26 or 27 in any suitable manner. FIG. 6 illustrates a plurality of fasteners 54 for engaging a plurality of studs 56 which extend rearwardly from the appendage and through the cargo door at the positions indicated.

The purpose of the vertical openings 49 through the lower central portion of the appendage is to receive air from the underside of the vehicle and to dispel that air outwardly through the rearwardly open plenum chamber to equalize the pressure differential between the front and rear ends of the vehicle. One system for supplying air to the plenum chamber is illustrated in FIGS. 7 and 8. An outer skirt 58 includes a pair of symmetrical side walls 60 and 62 which span a substantial portion of the length of the trailer. The forward ends of the side walls are spaced apart by approximately the full width of the trailer and the walls taper inwardly and rearwardly therefrom to define a generally straight main air duct 64, the rearward end of which communicates directly with the appendage openings 49. The main air duct 64 may be covered on the underside and extends forwardly over the wheel axles whereupon the outer skirt side walls 60 and 62 increase in height to better trap and direct air rearwardly therefrom.

Centered below the trailer of FIGS. 7 and 8, there is mounted a ground effect of hovercraft type fan blade 66 which is driven from a gear box 68 having a drive shaft 70 extended forwardly therefrom through bearing blocks 72 and 74 for connection to any suitable power source such as a hydraulic motor operated by the tractor hydraulic system. The fan blade 66 is surrounded by a circular inner skirt 76 to direct air downwardly therefrom. Telescoped about the inner skirt is a height adjustable intermediate skirt 78 having a lower edge adapted for placement in adjacent relation to the road surface for maximizing the lift capability of the fan blades 66. A pair of wheels 80 are mounted on an axle 82 which is connected to the forward edge of intermediate skirt 78 for maintaining the skirt in clearance relation from the road surface. Telescoping or otherwise adjustable linkages 84 are provided for stabilizing the skirt wheels 80.

The lower open end of the intermediate skirt 78 has a series of uniformly spaced louvers 86 extended thereacross. Referring to the detail view in FIG. 7A, each louver is pivotally supported on a horizontal central axis 88 and is connected at its upper end to a control arm 90 which is adjustable fore and aft by a hydraulic cylinder 92, for example, to regulate the angle of the louvers. When the control arm is advanced forwardly, the louvers are inclined from the relatively vertical solid line positions of FIG. 7A to the inclined dotted line positions whereupon air forced downwardly by the fan blade 66 is directed rearwardly to contribute to the forward propulsion of the vehicle and to the forced aerodynamic flow of air rearwardly through the outer skirt toward the plenum chamber.

Figure 10:
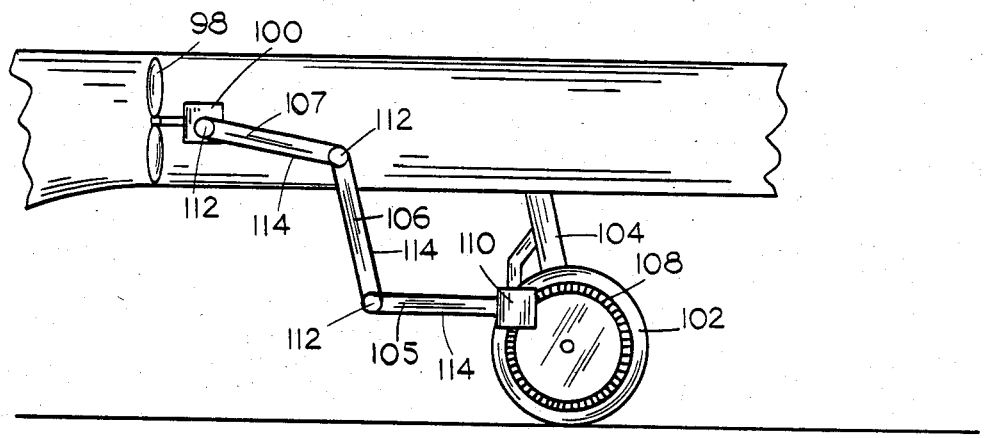
FIG. 10 is a detail perspective view of the drive wheel for the nonloadbearing horizontal axis blower.

An alternate configuration is shown in FIGS. 9 and 10. An outer skirt 94 defines an elongated tubular conduit which flares downwardly and substantially outwardly at its forward end to form an enlarged mouth 96 that is forwardly open to collect air in response to forward movement of the vehicle. Rearwardly of mouth 96, a nonloading bearing fan 98 is supported for rotation about a horizontal axis by a gear box 100. Suitable drive means is provided for the fan so that air is forced rearwardly through skirt 94 for a forced aerodynamic air supply to the plenum chamber. A preferred drive means for fan 98 includes a ground engaging drive wheel 102 supported on the lower end of a collapsible framework 104 and connected by pivot linkages 105, 106 and 107 to the gear box 100. Gear teeth 108 on wheel 102 are engaged by a driven gear of gear box 110. A series of pulleys 112 and drive belts 114 are arranged on the linkages to drivingly interconnect the gear boxes 100 and 110 for a wholly self-contained drive system for fan 98.

Figure 11:
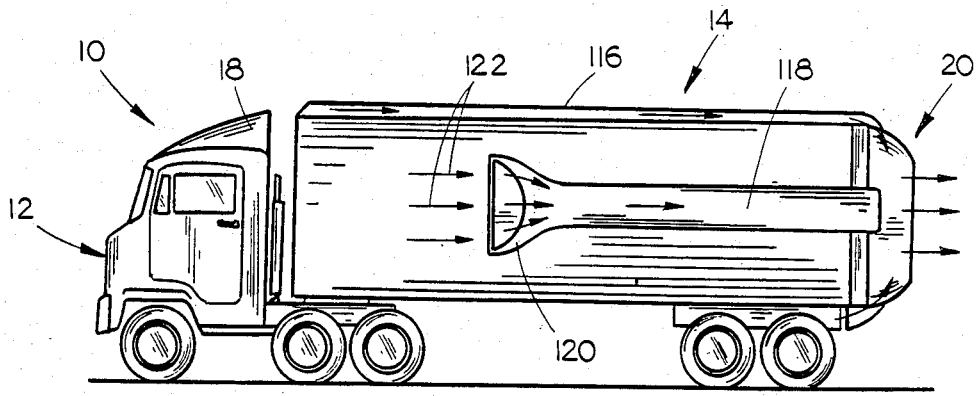
FIG. 11 is a side elevational view of an alternate embodiment including ducts along the sides and top of a vehicle.

Referring to FIG. 11, it is seen that the streamlining appendage 20 of the invention can be utilized even without forced aerodynamics. An elongated duct 116 extends along the top of the trailer. Duct 116 is open at its forward end and communicates at its rearward end with a vertical opening through an upper portion of the appendage for transferring air from the high pressure region at the front of the trailer into the plenum chamber to dissipate the low pressure area behind the trailer. Similarly, an elongated duct 118 communicates with the plenum chamber through a side opening through the appendage and extends forwardly along the trailer side wall into a forwardly open mouth portion 120 which facilitates the collection of a greater quantity of air as indicated by arrows 122.

Whereas the invention has been shown and described herein in connection with preferred embodiments thereof, it is understood that many modifications, substitutions and additions may be made which are within the intended broad scope of the appended claims. Accordingly, there has been described a streamlining appendage for the rearward end of a vehicle, which appendage accomplishes at least all of the stated objects.

I claim:

1. A streamlining appendage for the rearward end of a vehicle having a generally flat upright rearward surface, comprising, an inflatable upright peripheral body defining and surrounding
    a rearwardly open plenum chamber, said body having
        a generally flat upright front wall having a top edge, bottom edge and opposite side edges,
        a top wall which extends rearwardly and downwardly from said top edge,
        a pair of opposite side walls which extends rearwardly and transversely inwardly from said opposite side edges, and
        a top inner wall and pair of opposite side inner walls connected to and extended between said front wall, top wall and side walls to at least partially define the inflatable peripheral body outwardly of said inner wall and said plenum chamber inwardly of said inner wall,
    means for directing a source of air into said plenum chamber for escape through the open rearward end of said plenum chamber, and
    said peripheral body having forward and rearward ends, being relatively thick at the forward end and tapering rearwardly therefrom with decreasing thickness.

2. The appendage of claim 1 wherein said body further comprises a bottom wall which extends rearwardly and upwardly from said bottom edge.

3. The appendage of claim 1 wherein said top wall and side walls each have an arcuate outer surface.

4. The appendage of claim 1 wherein said body is inflatable and collapsible and further comprising means for inflating said body independent of said aforementioned means for directing a source of air into said plenum chamber.

5. The appendage of claim 1 wherein said body is split along a rearwardly extended vertical plane into two generally C-shaped half body sections.

6. The appendage of claim 2 wherein said means for directing a source of air into said plenum chamber comprises an opening through said bottom wall and duct means for directing air to and through said opening.

7. In combination with a vehicle having forward and rearward ends and a generally flat upright rearward surface, a streamlining appendage for the rearward end thereof, comprising an inflatable upright peripheral body defining and surrounding a rearwardly open plenum chamber, said body having a generally flat upright front wall having a top edge, bottom edge and opposite side edges, a top wall which extends rearwardly and downwardly from said top edge, a pair of opposite side walls which extend rearwardly and transversely inwardly from said opposite side edges, and a top inner wall and pair of opposite side inner walls connected to and extended between said front wall, top wall and side walls to at least partially define the inflatable peripheral body outwardly of said inner wall and said plenum chamber inwardly of said inner wall, means for directing a source of air into said plenum chamber for escape through the open rearward end of said plenum chamber and said rearward end of the vehicle having top, bottom and opposite side edges, said top and opposite side edges of the front wall of said body being registered with said top and opposite side edges of the rearward end of the vehicle, said peripheral body having forward and rearward ends, being relatively thick at the forward end and tapering rearwardly therefrom with decreasing thickness.

8. The combination of claim 7 wherein said top wall and side walls each have an arcuate outer surface.

9. The combination of claim 7 wherein said body is inflatable and collapsible and further comprising means for inflating said body independent of said aforementioned means for directing a source of air into said plenum chamber.

10. The combination of claim 7 wherein said rearward end of the vehicle comprises a pair of hinged doors each having inner and outer edges, said outer edges being hingedly connected to the vehicle such that said inner edges are positioned in adjacent aligned relation upon movement of said doors to a closed position in a common plane, said peripheral body being split along a rearwardly extended vertical plane into two generally C-shaped half sections, a respective one of said half sections being mounted on each door for registration with one another upon movement of said doors to the closed positions thereof.

11. The combination of claim 9 further comprising means biasing said body toward a collapsed position.

12. The combination of claim 7 wherein said means for directing a source of air into said plenum chamber comprises a depending open bottomed skirt means on the underside of said vehicle, said skirt including a pair of opposite side walls defining an air flow path toward and into said plenum chamber.

13. The combination of claim 12 further comprising a bottom wall connected to and extended between the lower edges of said skirt side walls, said bottom wall covering at least a rearward portion of said air flow path.

14. The combination of claim 12 further comprising a forced air blower means on the underside of said vehicle between said skirt side walls, said blower means being oriented for directing air downwardly therefrom and further comprising an open bottomed inner skirt surrounding said blower means.

15. The combination of claim 14 further comprising an open bottomed intermediate skirt substantially surrounding said blower means, and further comprising means for raising and lowering said intermediate skirt with respect to said blower means.

16. The combination of claim 15 further comprising means for operatively connecting the means for raising and lowering said intermediate skirt to the vehicle brake system such that said intermediate skirt is raised in response to application of the vehicle brakes.

17. The combination of claim 15 further comprising wheel means rotatably mounted on said intermediate skirt, said wheel means extending at least slightly below said skirt to maintain said skirt in clearance relation from a road surface engaged by said wheel means.

18. The combination of claim 15 further comprising generally horizontally extended louver means below said blower means, said louver means being pivotally adjustable to direct air downwardly and rearwardly from said blower means at selected inclinations.

19. The combination of claim 18 wherein said louver means extend across and are mounted on said intermediate skirt.

20. The combination of claim 12 wherein said skirt defines an elongated rearwardly extended generally tubular air flow duct open at its forward end and further comprising a powered fan means disposed within said duct and operative to force air rearwardly therethrough.

21. The combination of claim 20 further comprising a ground wheel mounted on said vehicle and a drive linkage means interconnecting said ground wheel and fan means for operating said fan means in response to rotation of the ground wheel.

22. The combination of claim 7 wherein said means for directing a source of air into said plenum chamber includes an elongated duct mounted on and extending longitudinally along the top of said vehicle, said duct including a forwardly open wind scoop at the forward end thereof and a rearward end in communication with said plenum chamber.

23. The combination of claim 22 further comprising an elongated duct supported on and extending longitudinally along a side wall of the vehicle, said side wall duct having a forwardly open wind scoop at the forward end thereof and a rearward end in communication with said plenum chamber.

* * * * *